United States Patent [19]
Choi

[11] Patent Number: 5,864,761
[45] Date of Patent: Jan. 26, 1999

[54] SS7 MAP PROVIDER SYSTEM

[75] Inventor: Soo-Jung Choi, Incheon, Rep. of Korea

[73] Assignee: Daewoo Telecom, Ltd., Incheon, Rep. of Korea

[21] Appl. No.: 972,683

[22] Filed: Nov. 18, 1997

[51] Int. Cl.⁶ ...................................................... H04M 3/00
[52] U.S. Cl. ........................... 455/461; 455/560; 370/467; 379/230
[58] Field of Search ..................................... 455/432, 435, 455/461, 560, 445, 466; 370/465, 467, 469, 522, 524; 379/230, 29, 30

[56] References Cited

U.S. PATENT DOCUMENTS

| | | | |
|---|---|---|---|
| 5,396,543 | 3/1995 | Beeson, Jr. et al. | 455/560 |
| 5,706,286 | 1/1998 | Reiman et al. | 370/467 |

*Primary Examiner*—Doris H. To
*Attorney, Agent, or Firm*—Pennie & Edmonds LLP

[57] ABSTRACT

A MAP provider system is provided to process SS7 (signalling system No.7) MAP (mobile application part) protocol between MAP user and TCAP (transaction capabilities application part). The system comprises a first processing block for receiving from the MAP user a MAP common primitive and a MAP specific primitive and converting the MAP common primitive to a TCAP dialogue handling primitive; a second processing block for converting the MAP specific primitive from the first processing block to a TCAP component handling primitive if the first processing block receives the MAP specific primitive after the MAP common primitive; a third processing block for receiving from a TCAP the TCAP dialogue handling primitive and a TCAP component handling primitive and converting the TCAP dialogue handling primitive to a MAP common primitive; a fourth processing block for receiving the TCAP component handling primitive from the third converting block to check whether or not the third processing block receives the TCAP component handling primitive after receiving the TCAP dialogue handling primitive; and a fifth converting block for converting the TCAP component handling primitive from the fourth processing block to a MAP specific primitive if the third processing block receives the TCAP component handling primitive after receiving the TCAP dialogue handling primitive.

1 Claim, 3 Drawing Sheets

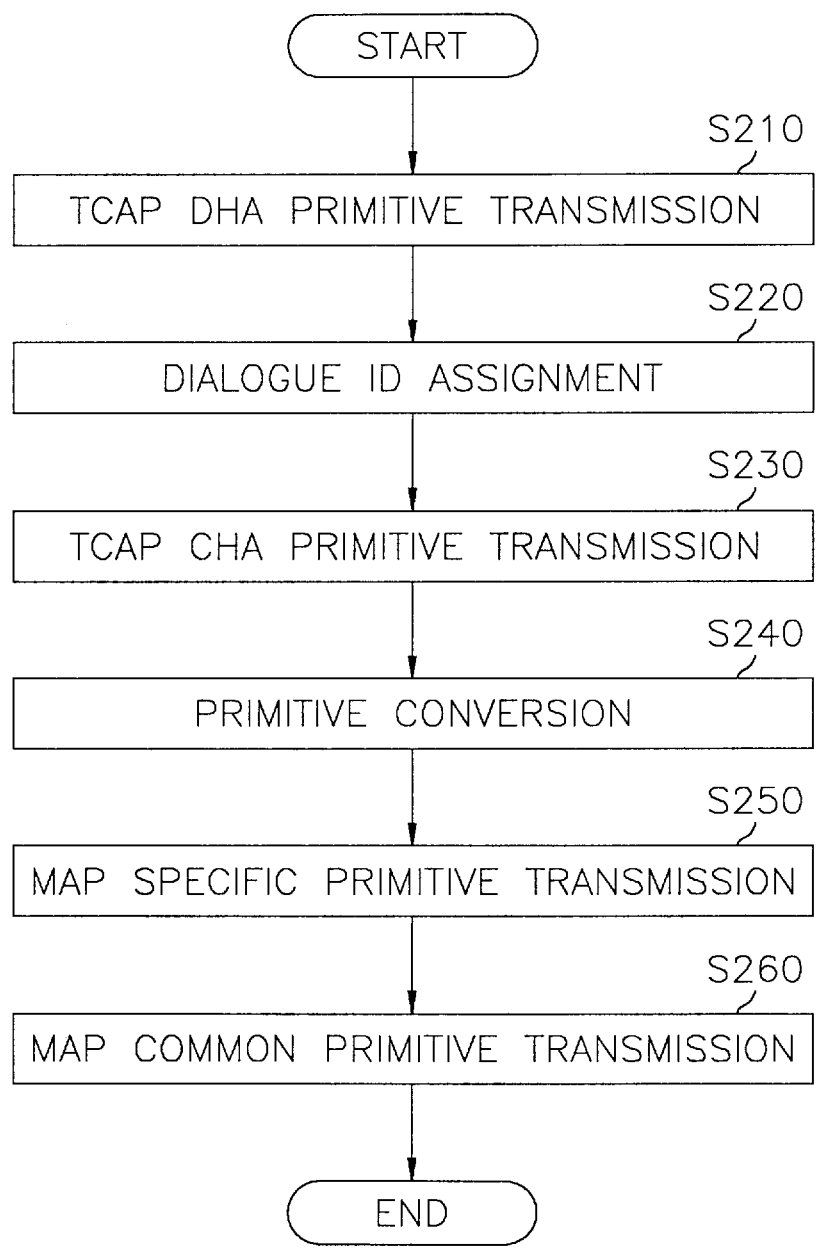

SS7 MAP PROVIDER SYSTEM

FIELD OF THE INVENTION

The present invention relates to a mobile communications system; and, more particularly, to a MAP provider system for processing a SS7 MAP protocol.

BACKGROUND OF THE INVENTION

In a mobile communications network, the access element from the mobile network to another telecommunication network, and vice versa, is a MSC (mobile switching center) through which not only calls and call-related signalling but also non-call related signalling transit.

For example, in the GSM (global system for mobile communications), a BSS (base station subsystem) includes a plurality of base transceiver stations for communicating with mobile stations through the radio interface and a base station controller. The BSS is connected to the MSC which can access registers such as a HLR (home location register) using a SS7 (signalling system No.7) interface and a VLR (visitor location register) being usually included to the MSC. Using several MSC's connected to each other with trunk lines via the SS7 interfaces, it is possible to build a mobile subscriber serving network which has a large coverage area. And the MSC is connected via the SS7 interface to a communications network such as a PSTN (public switched telephone network) or ISDN (integrated services digital network).

The signalling for mobility managements, which are grouped together in MAP (mobile application part), a highest layer of the SS7. The MAP protocol uses the services provided by the SS7 protocol TCAP (transaction capabilities application part). For example, when a mobile subscriber roams into a new MSC area, the VLR, i.e., the MAP user, may request service profile information from the HLR using the MAP information carried within TCAP message. The TCAP supports the exchange of non-circuit related data between applications.

The MAP provider system converts a MAP primitive from the MAP user to a TCAP primitive to be transferred to the TCAP and a TCAP primitive from the TCAP to a MAP primitive to be transferred to the MAP user.

The conventional MAP provider system comprises a plurality of a pair of state machines, a DSM (dialogue state machines) and one of a RSM (requesting MAP service state machine) and a PSM (performing MAP service state machine).

The DSM is created per MAP dialogue. When the dialogue is initiated by the MAP user, the created DSM receives a MAP common primitive, e.g., a dialogue start primitive, and a MAP specific primitive, e.g., a handoff primitive, from the MAP user. The DSM converts the MAP common primitive to a TCAP DHA (dialogue handling) primitive, e.g., a unidirectional type primitive.

The RSM that handles a MAP service requested during the dialogue is created by the corresponding DSM for a requested MAP service and converts the MAP specific primitive to a TCAP CHA (component handling) primitive.

On the other hand, when the dialogue is initiated by the TCAP, the created DSM receives a TCAP DHA primitive and a TCAP CHA primitive, e.g, an invoke primitive, from the TCAP and converts the TCAP DHA primitive to a MAP common primitive.

The PSM which handles a MAP service performed during the dialogue is created by the corresponding DSM for a MAP service to be performed and converts the TCAP CHA primitive to a MAP specific primitive.

In the conventional system, however, it is necessary to provide an amount of memory space for loading processes generated to process the MAP protocol since two processes, one DSM and one of the RSM and the PSM, are created per MAP dialogue. Therefore, it is desirable to provide a MAP provider system capable of reducing required memory space.

SUMMARY OF THE INVENTION

It is, therefore, a primary object of the present invention to provide a SS7 MAP provider system capable of reducing required memory space.

In accordance with the present invention, there is provided a MAP provider system is provided to process SS7 (signalling system No.7) MAP (mobile application part) protocol between a MAP user and a TCAP (transaction capabilities application part) comprising:

a first processing block for receiving from the MAP user a MAP common primitive and a MAP specific primitive for a dialogue initiated by the MAP user and converting the MAP common primitive to a TCAP dialogue handling primitive;

a second processing block for receiving the MAP specific primitive from the first processing block to convert it to a TCAP component handling primitive if the first processing block receives the MAP specific primitive after the MAP common primitive, wherein the TCAP dialogue handling primitive is transferred from the first processing block to the TCAP after the converted TCAP component handling primitive is transferred from the second processing block to the TCAP;

the first processing block receiving from the MAP user the MAP common primitive and the MAP specific primitive for another dialogue initiated by the MAP user and converting the MAP common primitive for the another dialogue while the second processing block performs the MAP specific primitive conversion;

a third processing block for receiving from a TCAP the TCAP dialogue handling primitive and a TCAP component handling primitive for a dialogue initiated by the TCAP and converting the TCAP dialogue handling primitive to a MAP common primitive;

a fourth processing block for receiving the TCAP component handling primitive from the third processing block to check whether or not the third processing block receives the TCAP component handling primitive after receiving the TCAP dialogue handling primitive; and a fifth processing block for receiving the TCAP component handling primitive from the fourth processing block to convert the TCAP component handling primitive to a MAP specific primitive if the third processing block receives the TCAP component handling primitive after receiving the TCAP dialogue handling primitive, wherein the MAP common primitive is transferred from the third processing block to the MAP user after the MAP specific primitive is transferred from the fifth processing block to the MAP user;

the fourth processing block receiving from the TCAP the TCAP component handling primitive for another dialogue initiated by the TCAP and checking whether or not the third processing block receives the TCAP component handling primitive after receiving the TCAP dialogue handling primitive while the fifth processing block performs the TCAP component primitive conversion.

BRIEF DESCRIPTION OF THE DRAWINGS

The above and other objects and features of the present invention will become apparent from the following description of preferred embodiments given in conjunction with the accompanying drawings, in which:

FIGS. 2A and 2B provide flow charts for illustrating operations of the MAP provider system in FIG. 1.

DETAILED DESCRIPTION OF THE PREFERRED EMBODIMENTS

Figure 1:
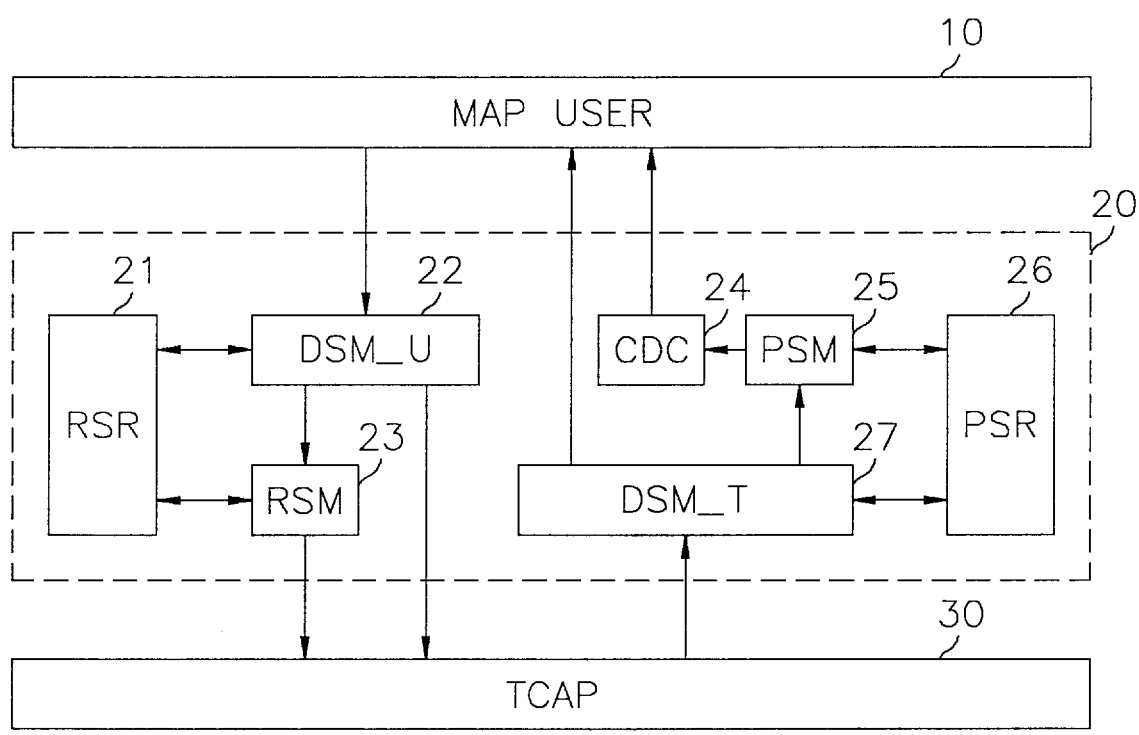
FIG. 1 presents a block diagram of a MAP provider system for processing SS7 MAP protocol between a MAP user and the TCAP in accordance with the present invention.

Referring to FIG. 1, there is provided a block diagram of a MAP (mobile application part) provider system 20 between a MAP user 10 and the TCAP (transaction capabilities application part) 30 for processing SS7 MAP protocol in accordance with the present invention.

The MAP provider system 20 converts a TCAP primitive from the TCAP 30 to a MAP primitive to be transferred to the MAP user 10.

The MAP provider system 20 comprises a RSR (requesting MAP service state register) 21, a DSM_U (MAP user initiating dialogue state machine) 22, a RSM (requesting MAP service state machine) 23, a CDC (component handling primitive decoder) 24, a PSM (performing state machine) 25, a PSR (performing MAP service state register) 26 and a DSM_T (TCAP initiating dialogue state machine) 27.

The RSR 21 registers the status of each of dialogues initiated by the MAP user 10 and the registered status is updated by the DSM_U 22 and the RSM 23.

The DSM_U 22 that handles dialogues initiated by the MAP user 10 receives a MAP common primitive and a MAP specific primitive from the MAP user 10 and converts the MAP common primitive to a TCAP DHA (dialogue handling) primitive to transfer it to the TCAP 30.

The RSM 23 which handles MAP services requested during the dialogues receives the MAP specific primitive from the DSM_U 22 to convert it to a TCAP CHA (component handling) primitive to transfer it to the TCAP 30.

The PSR 26 registers the status of each of dialogues initiated by the TCAP 30 and the registered status is updated by the PSM 25 and the DSM_T 27.

The DSM_T 27 which handles dialogues initiated by the TCAP 30 receives a TCAP DHA primitive and a TCAP CHA primitive from the TCAP 30 and converts the TCAP DHA to a MAP common primitive to transfer it to the MAP user 10.

The PSM 25 that handles MAP services performed during the dialogues receives the TCAP CHA primitive from the DSM_T 27 and transfer it to the CDC 24.

The CDC 24 converts the TCAP CHA primitive to a MAP specific primitive to transfer it to the MAP user 10.

Figure 2A:
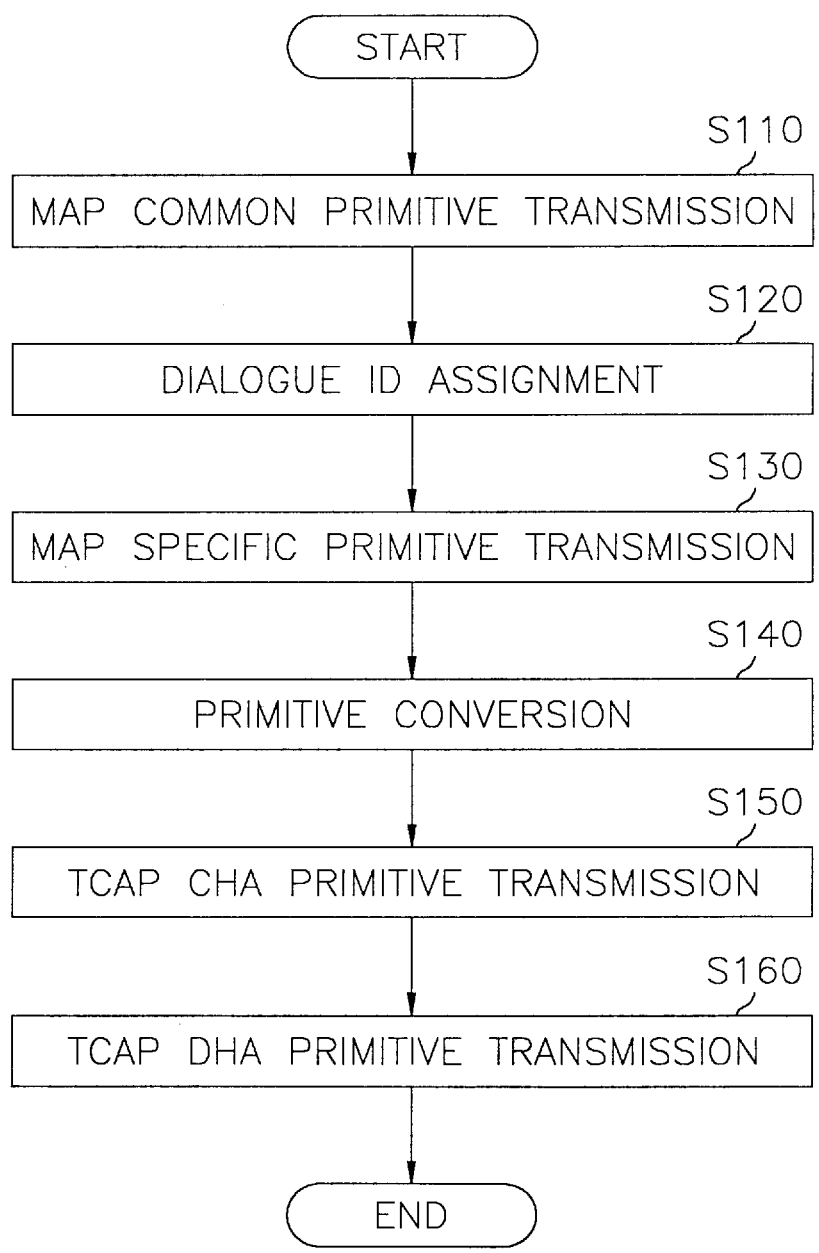

Referring to FIG. 2A, there is provided a flow chart illustrating an operation of the MAP provider system in FIG. 1 for processing the MAP dialogues initiated by the MAP user 10.

When the DSM_U 22 receives a MAP common primitive from the MAP user 10 at step S110, the DSM_U 22 assigns a dialogue ID (identification) to the dialogue and registers the status of the dialogue as a user-message waiting state on the RSR 21 at step S120.

During the user-message waiting state, the DSM_U 22 receives a MAP specific primitive from the MAP user 10 at step S130 transfers the MAP specific primitive to the RSM 23 and updates the status of the dialogue to a user-message received state on the RSR 21 at step S130.

During the user-message received state, the DSM_U 22 converts the MAP common primitive to a TCAP DHA primitive and the RSM 23 converts the MAP specific primitive to a TCAP CHA primitive at step S140. The RSM 23 transmits the TCAP CHA primitive to the TCAP 30 and updates the status of the dialogue to a user-message transmitted state on the RSR 21 at step S150.

During the user-message transmitted state, the DSM_U 22 transmits the TCAP DHA primitive to the TCAP 30 at step S160.

The MAP primitive of the dialogue is processed independently of that of other dialogues if the DSM_U 22 receives the MAP specific primitive from the MAP user 10 during the message-waiting state of the corresponding dialogue. In other words, it is capable of processing primitives for a dialogue during the process for another dialogue.

Referring to FIG. 2B, there is provided a flow chart illustrating an operation of the MAP provider system in FIG. 1 for processing the MAP dialogues initiated by the TCAP 30.

When the DSM_T 27 receives a TCAP DHA from the TCAP 30 at step S210, the DSM_T 27 assigns a dialogue ID (identification) to the dialogue and registers the status of the dialogue as a TCAP-message waiting state on the PSR 26 at step S220.

During the TCAP-message waiting state, the DSM_T 27 receives a TCAP CHA primitive from the TCAP 30 at step S230. The DSM_T 27 transfers the TCAP CHA primitive to the PSM 25 and updates the status of the dialogue to a TCAP-message received state on the PSR 26 at step S230.

During the TCAP-message received state, the DSM_T 27 converts the TCAP DHA primitive to a MAP common primitive and the PSM 25 transfers the TCAP CHA primitive to the CDC 24 to convert it to a MAP specific primitive at step S240.

The CDC 24 transmits the MAP specific primitive to the MAP user 10 and the PSM 25 updates the status of the dialogue to a TCAP-message transmitted state on the PSR 26 at step S250.

During the TCAP-message transmitted state, the DSM_T 27 transmits the MAP specific primitive to the MAP user 10 at step S260.

The TCAP primitive of the dialogue is processed independently of that of other dialogues if the DSM_T 27 receives the TCAP CHA primitive from the TCAP 30 during the TCAP-message waiting state of the corresponding dialogue. In other words, it is capable of processing primitives for a dialogue during the process for another dialogue.

Further, the PSM 25 is capable of processing the primitives of other dialogue during the conversion of the CDC 24.

As described above, the usage of the memory space for loading the processes can be restricted since the number of existing processes are fixed as four regardless of the number of the dialogues between the MAP user 10 and the TCAP 30.

While the present invention has been shown and described with respect to the particular embodiments, it will be apparent to those skilled in the art that many changes and modifications may be made without departing from the spirit and scope of the invention as defined in the appended claims.

What is claimed is:

1. A MAP provider system for processing SS7 (signalling system No.7) MAP (mobile application part) protocol between a MAP user and a TCAP (transaction capabilities application part), comprising:

a first processing means for receiving from the MAP user a MAP common primitive and a MAP specific primitive for a dialogue initiated by the MAP user and converting the MAP common primitive to a TCAP dialogue handling primitive;

a second processing means for receiving the MAP specific primitive from the first processing means to convert it to a TCAP component handling primitive if the first processing means receives the MAP specific primitive after the MAP common primitive, wherein the TCAP dialogue handling primitive is transferred from the first processing means to the TCAP after the converted TCAP component handling primitive is transferred from the second processing means to the TCAP;

the first processing means receiving from the MAP user the MAP common primitive and the MAP specific primitive for another dialogue initiated by the MAP user and converting the MAP common primitive for said another dialogue while the second processing means performs the MAP specific primitive conversion;

a third processing means for receiving from a TCAP the TCAP dialogue handling primitive and a TCAP component handling primitive for a dialogue initiated by the TCAP and converting the TCAP dialogue handling primitive to a MAP common primitive;

a fourth processing means for receiving the TCAP component handling primitive from the third processing means to check whether or not the third processing means receives the TCAP component handling primitive after receiving the TCAP dialogue handling primitive; and a fifth converting means for receiving the TCAP component handling primitive from the fourth processing means to convert the TCAP component handling primitive to a MAP specific primitive if the third processing means receives the TCAP component handling primitive after receiving the TCAP dialogue handling primitive, wherein the MAP common primitive is transferred from the third processing means to the MAP user after the MAP specific primitive is transferred from the fifth processing means to the MAP user;

the fourth processing means receiving from the TCAP the TCAP component handling primitive for another dialogue initiated by the TCAP and checking whether or not the third processing means receives the TCAP component handling primitive after receiving the TCAP dialogue handling primitive while the fifth processing means performs the TCAP component primitive conversion.

* * * * *